United States Patent
Kim et al.

(10) Patent No.: US 9,382,456 B2
(45) Date of Patent: *Jul. 5, 2016

(54) ADHESIVE FILM FOR POLARIZING PLATE, POLARIZING PLATE INCLUDING THE SAME, AND OPTICAL DISPLAY INCLUDING THE SAME

(71) Applicant: CHEIL INDUSTRIES INC., Gumi-si, Gyeongsangbuk-do (KR)

(72) Inventors: Yi Eun Kim, Uiwang-si (KR); Won Kim, Uiwang-si (KR); Yoo Jin Suh, Uiwang-si (KR); Seung Jun Lee, Uiwang-si (KR); In Cheon Han, Uiwang-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/309,795

(22) Filed: Jun. 19, 2014

(65) Prior Publication Data

US 2014/0378614 A1  Dec. 25, 2014

(30) Foreign Application Priority Data

Jun. 21, 2013 (KR) .................. 10-2013-0071894
Dec. 10, 2013 (KR) .................. 10-2013-0153521

(51) Int. Cl.
*C09J 133/08* (2006.01)
*C09J 7/00* (2006.01)
(Continued)

(52) U.S. Cl.
CPC ...... *C09J 133/08* (2013.01); *C09J 7/00* (2013.01); *C09J 133/066* (2013.01); *G02B 5/3033* (2013.01); *C08L 2314/00* (2013.01);
(Continued)

(58) Field of Classification Search
CPC ............. C08G 18/6254; C08G 18/625; C08G 18/6225; C09J 133/08; C09J 133/10; C09J 133/12; C09J 133/066
USPC .............................................. 525/124
See application file for complete search history.

(56) References Cited

U.S. PATENT DOCUMENTS 5,527,616 A * 6/1996 Hatano .................. B32B 7/12
                                                           428/423.1
5,578,657 A   11/1996 Inoue et al.
(Continued)

FOREIGN PATENT DOCUMENTS

CN        1118800 A    3/1996
CN        1740256 A    3/2006
(Continued)

OTHER PUBLICATIONS

Chinese Patent Office action dated Mar. 17, 2015, in patent application No. CN 201410028210.1, with English translation, 14 pages.
(Continued)

*Primary Examiner* — Mike M Dollinger
(74) *Attorney, Agent, or Firm* — Lewis Roca Rothgerber Christie LLP (57) ABSTRACT

An adhesive film for polarizing plates includes a cured product of a composition including a (meth)acrylic copolymer and a cross-linking agent, and has a peel strength ratio of about 6 or more, as represented by Equation 1. An adhesive composition for the adhesive film, a polarizing plate including the adhesive film, and an optical display including the adhesive film are also described.

15 Claims, 1 Drawing Sheet

(51) Int. Cl.
*G02B 5/30* (2006.01)
*C09J 133/06* (2006.01)

(52) U.S. Cl.
CPC ...... *C09J2201/622* (2013.01); *C09J 2203/318* (2013.01); *C09J 2433/00* (2013.01)

(56) References Cited

U.S. PATENT DOCUMENTS

| | | | | |
|---|---|---|---|---|
| 5,754,338 A | * | 5/1998 | Wilson | B29C 66/234 |
| | | | | 359/529 |
| 2006/0128925 A1 | | 6/2006 | Arai et al. | |
| 2012/0064339 A1 | * | 3/2012 | Yamagata | C09J 133/08 |
| | | | | 428/355 AC |
| 2012/0115280 A1 | * | 5/2012 | Yasuda | C09J 133/08 |
| | | | | 438/113 |
| 2012/0142871 A1 | | 6/2012 | Zhong et al. | |
| 2012/0181703 A1 | | 7/2012 | Park et al. | |
| 2012/0309873 A1 | | 12/2012 | Ogawa et al. | |
| 2013/0040123 A1 | * | 2/2013 | Cho | C09J 133/08 |
| | | | | 428/220 |
| 2013/0309434 A1 | | 11/2013 | Hiramatsu et al. | |
| 2014/0186603 A1 | * | 7/2014 | Kim | C09J 7/0217 |
| | | | | 428/220 |
| 2014/0205827 A1 | * | 7/2014 | Mun | C09J 7/0217 |
| | | | | 428/220 |

FOREIGN PATENT DOCUMENTS

| | | |
|---|---|---|
| CN | 101899127 A | 12/2010 |
| CN | 102816544 A | 12/2012 |
| CN | 102816545 A | 12/2012 |
| EP | 2540789 A2 | 1/2013 |
| JP | 2003-073638 A | 3/2003 |
| JP | 2005-53976 A | 3/2005 |
| KR | 10-2012-0082773 A | 7/2012 |
| WO | WO 2011/105878 A2 | 9/2011 |
| WO | WO 2012/105341 A1 | 8/2012 |

OTHER PUBLICATIONS

Chinese Patent Office action dated Sep. 6, 2015 in corresponding patent application No. 201410279652.3, 13 pages.

* cited by examiner

ADHESIVE FILM FOR POLARIZING PLATE, POLARIZING PLATE INCLUDING THE SAME, AND OPTICAL DISPLAY INCLUDING THE SAME

CROSS-REFERENCE TO RELATED APPLICATIONS

This application claims priority to and the benefit of Korean Patent Application No. 10-2013-0071894, filed on Jun. 21, 2013, and Korean Patent Application No. 10-2013-0153521, filed on Dec. 10, 2013, in the Korean Intellectual Property Office, the entire contents of both of which are incorporated herein by reference.

BACKGROUND

1. Technical Field

The present invention relates to an adhesive film for polarizing plates, a polarizing plate including the same, and an optical display including the same.

2. Description of the Related Art

Polarizing plates are provided on upper and lower sides of a liquid crystal display (LCD) panel and may be bonded to the LCD panel via an adhesive film for polarizing plates. The polarizing plate shrinks or expands under severe conditions such as high temperature (for example, 85° C.) and high humidity. If the adhesive film for polarizing plates exhibits poor durability, the polarizing plate peels off of the LCD panel and thus suffers from failures such as detachment, bubbling and the like, and can also cause light leakage due to a difference in dimensional change between the polarizing plate and the adhesive film for polarizing plates. Thus, the adhesive film should have high durability and light leakage suppression properties, which can be accomplished by controlling or mitigating stress due to shrinkage or expansion of the polarizing plate. In addition, the adhesive film should exhibit good re-peeling capability to enable reworking which may be necessary due to a foreign substance or a process failure during attachment of the polarizing plate including an adhesive layer to the LCD panel. The adhesive film should also exhibit good cuttability and a short aging period to enable quick use after coating an adhesive in order to improve productivity of the polarizing plate.

Although an over-cured hard type adhesive film for polarizing plates is highly crosslinked after aging and thus suppresses light leakage, the over-cured hard type adhesive film can suffer from detachment or wrinkling at the edges of the polarizing plate due to low initial adhesion. There is a trade-off between durability and light leakage depending on the amount of cross-linking agent. If the amount of the cross-linking agent is reduced, the polarizing plate suffers from severe light leakage despite good durability due to low crosslinking, and if the amount of the cross-linking agent is increased, the polarizing plate can have deteriorated durability although light leakage is suppressed.

SUMMARY

In accordance with one embodiment of the present invention, an adhesive film for polarizing plates may be formed of a composition including a (meth)acrylic copolymer and a cross-linking agent, and may have a peel strength ratio of about 6 or more, as represented by Equation 1:

$$\text{Peel strength ratio} = B/A \quad (A \text{ and } B \text{ are defined as in the following detailed description}). \quad \text{Equation 1}$$

In accordance with another embodiment of the present invention, a polarizing plate may include the adhesive film for polarizing plates as set forth above.

In accordance with a further embodiment of the present invention, an optical display may include the polarizing plate as set forth above.

DETAILED DESCRIPTION

As used herein, terms such as "upper" and "lower" are defined with reference to the accompanying drawings. Thus, it will be understood that the term "upper" can be used interchangeably with the term "lower". In addition, the term "(meth)acrylate" may refer to acrylate and/or methacrylate.

Hereinafter, an adhesive film for polarizing plates according to embodiments of the present invention will be described.

According to one embodiment of the invention, an adhesive film for polarizing plates may be used to bond a polarizing plate to a display panel. The polarizing plate may include: a polarizer; and an optical film one or both surfaces of the polarizer. The optical film may be a protective film or an optical compensation film, and the panel may be, for example, a panel of a liquid crystal display.

Generally, a polarizing plate includes a polarizer and an optical film which exhibits different physical properties, and the polarizer is a film stretched in one direction. As such, the polarizing plate can shrink or expand under severe conditions, such as high temperature and/or high humidity. The polarizing plate can suffer from light leakage and poor durability (e.g., detachment, bubbling, and the like) due to such behavior of the polarizer. Thus, the adhesive film for polarizing plates should enable control of light leakage by controlling or mitigating the stress due to shrinkage or expansion of the polarizing plate. The adhesive film should also prevent the polarizing plate from failing, such as from detachment from the liquid crystal cell, bubbling and the like, at high temperature and/or high humidity. According to embodiments of the present invention, a hard type adhesive film can suppress light leakage by controlling the stress due to shrinkage or expansion of the polarizing plate. Hard type adhesive films can sometimes suffer from deteriorations in peel strength due to low wettability at high temperature and/or high humidity (as compared with soft type adhesive films), and can therefore sometimes exhibit poor durability.

According to one embodiment of the invention, although the adhesive film for polarizing plates is a hard type adhesive film, the adhesive film has a peel strength ratio of about 6 or greater, as represented by Equation 1. As a result, the adhesive film exhibits good durability due to good wettability at high temperatures and high peel strength, and can prevent (or reduce) light leakage of the polarizing plate by controlling the stress due to shrinkage or expansion of the polarizing plate.

$$\text{Peel strength ratio} = B/A, \quad \text{Equation 1}$$

In Equation 1, A is the peel strength (unit: gf/25 mm) when the adhesive film is peeled off a glass substrate at an angle of 180° at 25° C. and at a tensile speed of 300 mm/min using a 30 kgf load cell, as measured on a specimen in which the polarizing plate including the adhesive film is formed on the glass substrate. B is the peel strength (unit: gf/25 mm) when the adhesive film is left at 85° C. for 60 minutes and then peeled off the glass substrate at an angle of 180° at 85° C. and at a tensile speed of 300 mm/min using a 30 kgf load cell, as measured on a specimen in which the polarizing plate including the adhesive film is formed on the glass substrate.

If the peel strength ratio is less than 6, when a panel including the polarizing plate bonded thereto is left at high temperature and/or high humidity, the polarizing plate can suffer deteriorations in durability or light leakage due to wrinkling or detachment at the edges. In one embodiment, the adhesive film may have a peel strength ratio of about 6 to about 20, for example about 6, 7, 8, 9, 10, 11, 12, 13, 14, 16, 16, 17, 18, 19, or 20. Peel strength may also be measured in accordance with JIS 2107. For example, a specimen for measurement of peel strength may be prepared by coating an adhesive composition for polarizing plates onto a polarizing plate, followed by aging for 2 days under constant temperature and humidity conditions of 35° C. and 45% RH (relative humidity). Here, the polarizing plate may be prepared by stacking triacetyl cellulose (TAC) protective films on both surfaces of a polarizer.

In some embodiments, in Equation 1, A may be about 200 gf/25 mm to about 500 gf/25 mm, for example, about 200 gf/25 mm to about 350 gf/25 mm. In some embodiments, B may be about 1500 gf/25 mm to about 3000 gf/25 mm, for example, about 1590 gf/25 mm to about 3000 gf/25 mm, or about 1900 gf/25 mm to about 3000 gf/25 mm. Within these ranges, the adhesive film can have a peel strength ratio according to embodiments of the invention, and the polarizing plate can exhibit good durability at high temperature and/or high humidity.

The adhesive film for polarizing plates may have a gel fraction (i.e., a degree of cross-linking) of about 70% or greater, for example, about 75% or greater, or about 75% to about 90%, as represented by Equation 2. Within these ranges, the adhesive film has high cross-linking density and thus can be effective in suppressing light leakage.

$$\text{Gel fraction (\%)} = (W3 - W1)/(W2 - W1) \times 100 \quad \text{Equation 2}$$

In Equation 2, $W1$ is the weight of a wire mesh, and $W2$ is the total weight of the wire mesh and the adhesive, which is obtained by drying an adhesive composition for polarizing plates at 120° C. for 3 minutes and leaving the adhesive composition at 35° C. and 45% RH for 1 hour, and then placing it on the wire mesh.

$W3$ is the total weight of the wire mesh and the adhesive where the adhesive is obtained by drying an adhesive composition for polarizing plates at 120° C. for 3 minutes and leaving the adhesive composition at 35° C. and 45% RH for 1 hour and is placed on the wire mesh, and the adhesive and the wire mesh are placed together in a sample bottle, followed by adding ethyl acetate into the sample bottle, and allowing it to stand at 25° C. for 1 day, followed by drying at 100° C. for 12 hours.

In addition, the adhesive film for polarizing plates is a hard type adhesive film and has a high storage modulus. The adhesive film may have a storage modulus at 30° C. of about $5 \times 10^5$ Pa to about $9 \times 10^5$ Pa, for example, about $6.5 \times 10^5$ Pa to about $7.5 \times 10^5$ Pa, as measured from 0° C. to 120° C. at a strain of 10% and a frequency of 10 Hz. Within these ranges, the adhesive film can achieve advantageous light leakage suppression.

The hard type adhesive films may have a gel fraction of about 70% or greater, as represented by Equation 2, and a storage modulus about $5 \times 10^5$ Pa to about $9 \times 10^5$ Pa, whereas soft type adhesive films may have a gel fraction of less than 70%, as represented by Equation 2, and a storage modulus of less than about $5 \times 10^5$ Pa.

Further, the adhesive film for polarizing plates according to embodiments of the present invention is a hard type adhesive film and has a creep distance of about 60 μm or less, for example, about 40 μm to about 50 μm. Within these ranges, the adhesive film can achieve advantageous light leakage suppression.

The adhesive film for polarizing plates may have a thickness of about 5 μm to about 100 μm. Within this range, the adhesive film can be applied to the polarizing plate.

The adhesive film for polarizing plates may be transparent and may have a haze at a wavelength of 550 nm, for example, of about 2% or less, for example, about 0% to about 1%.

The adhesive film for polarizing plates according to one embodiment of the invention may be formed of an adhesive composition for polarizing plates according to one embodiment of the invention. In one embodiment, the adhesive film may be prepared by aging the adhesive composition for polarizing plates at about 30° C. to about 35° C. and at about 40% RH to about 45% RH for about 48 hours to about 96 hours.

In one embodiment, the adhesive composition for polarizing plates includes a (meth)acrylic copolymer and a cross-linking agent. The (meth)acrylic copolymer reduces the ratio of copolymer free of a functional group by reducing loss of functional groups by adjusting reaction rates of the backbone and the functional groups to be similar to each other upon polymerization. This allows the (meth)acrylic copolymer to include the functional groups uniformly arranged on and connected to the (meth)acrylic copolymer backbone, and to have a weight average molecular weight of about 1,000,000 g/mol or less. In addition, the cross-linking agent may be a mixture of a modified polyisocyanate cross-linking agent and a metal chelate cross-linking agent.

The (meth)acrylic copolymer may be a (meth)acrylic copolymer in which reactive functional groups are uniformly arranged on and connected to a copolymer backbone at specified intervals. An adhesive film including a (meth)acrylic copolymer in which reactive functional groups are not uniformly arranged on and connected to a copolymer backbone at specified intervals exhibits poor fluidity due to high interaction between portions including a large number of functional groups arranged therein, and the adhesive film has a peel strength ratio of less than 2. Thus, the adhesive film can suffer from detachment or wrinkling due to poor durability. The reactive functional groups may include hydroxyl groups, carboxylic acid groups, and/or the like.

As used herein, the term "holding time" is used to determine whether the reactive functional groups are uniformly arranged on and connected to the (meth)acrylic copolymer backbone at specified intervals. The holding time is the period of time it takes to peel off the polarizing plate (which is coated with the (meth)acrylic copolymer) from a glass plate, and is measured when peeling the polarizing plate at a specified range of force from the glass plate. The polarizing plate including the (meth)acrylic copolymer in which the reactive functional groups are uniformly arranged has a short holding time due to low interaction between the reactive functional groups. In contrast, a polarizing plate including a (meth)acrylic copolymer in which the reactive functional groups are not uniformly arranged has a long holding time due to greater interaction between portions including a large number of the reactive functional groups.

In some embodiments, the (meth)acrylic copolymer may have a holding time of about 300 seconds to about 400 seconds. Within this range, the adhesive film for polarizing plates exhibits good wettability at high temperature and thus can have high peel strength and exhibit good durability.

The (meth)acrylic copolymer including the reactive functional groups uniformly arranged and connected thereto may be prepared through polymerization by introducing a (meth) acrylic monomer containing non-reactive functional groups (primary polymerization), followed by the dropwise addition of a (meth)acrylic monomer containing reactive functional groups (secondary polymerization). When polymerization is performed by the dropwise addition of the (meth)acrylic monomer containing reactive functional groups at a specified rate, loss of the reactive functional groups is reduced since the (meth)acrylic monomer containing reactive functional groups is not introduced at once. This allows the reactive functional groups to be uniformly arranged. When the (meth) acrylic monomer containing non-reactive functional groups and the (meth)acrylic monomer containing reactive functional groups are simultaneously mixed for polymerization, a (meth)acrylic copolymer in which the reactive functional groups are not uniformly arranged is obtained. The non-reactive functional group may be an alkyl group, for example, a $C_1$ to $C_{20}$ alkyl group, such as an unsubstituted $C_1$ to $C_{20}$ alkyl group, for example a $C_1$ to $C_5$ alkyl group.

The primary and secondary polymerizations may be performed by any suitable copolymer polymerization process, such as suspension polymerization, emulsion polymerization, solution polymerization, and/or the like. Each of the primary and secondary polymerizations may be performed at about 65° C. to about 70° C. for about 6 hours to about 8 hours.

The (meth)acrylic copolymer may be polymerized by adding a reaction initiator (e.g., a polymerization initiator) to the monomer mixture. The initiator may be added during the primary polymerization, and may include any suitable initiator, nonlimiting examples of which include 2,2-azobis(2,4-dimethylvaleronitrile), 2,2'-azobisisobutyronitrile, benzoyl peroxide, dilauroyl peroxide, tert-butyl-(2-ethylhexyl) monoperoxycarbonate, Cert-amyl-(2-ethylhexyl)monoperoxycarbonate, 1,1-di(tert-butylperoxy)cyclohexane, 1,1-di(tert-amylperoxy)cyclohexane, tert-butylperoxy-3,5,5-trimethylhexanoate, 1,1-di(tert-butylperoxy)-3,3,5-trimethylcyclohexane, potassium persulfate, sodium persulfate, ammonium persulfate, azo water-soluble initiators, and combinations thereof. The initiator may be added in an amount of about 0.001 parts by weight to about 2 parts by weight, for example, about 0.04 parts by weight to about 0.1 parts by weight, based on 100 parts by weight of the (meth) acrylic monomer containing non-reactive functional groups. Within these ranges, the adhesive film can exhibit a high storage modulus.

The (meth)acrylic monomer containing non-reactive functional groups may be a (meth)acrylic acid alkyl ester containing an alkyl group, and may include a (meth)acrylic acid ester containing an unsubstituted $C_1$ to $C_{20}$ linear or branched alkyl group. For example, the (meth)acrylic monomer containing non-reactive functional groups may include at least one of methyl (meth)acrylate, ethyl (meth)acrylate, propyl (meth) acrylate, n-butyl (meth)acrylate, tert-butyl (meth)acrylate, iso-butyl (meth)acrylate, pentyl (meth)acrylate, hexyl (meth) acrylate, 2-ethylhexyl (meth)acrylate, heptyl (meth)acrylate, octyl (meth)acrylate, iso-octyl (meth)acrylate, nonyl (meth) acrylate, decyi (meth)acrylate, and dodecyl (meth)acrylate, but is not limited thereto.

The (meth)acrylic monomer containing non-reactive functional groups may be present in an amount of about 80% by weight (wt %) to about 99.99 wt %, for example, about 90 wt % to about 99 wt %, or about 90, 91, 92, 93, 94, 95, 96, 97, 98, or 99 wt %, based on the total weight of the monomer mixture for the (meth)acrylic copolymer. Within these ranges and amounts, the adhesive film does not suffer from (or suffers from reduced) bubbling or detachment under the conditions used to test for heat resistance and moisture resistance, and can exhibit good reworkability and durability.

The (meth)acrylic monomer containing reactive functional groups may include a (meth)acrylic monomer containing hydroxyl groups and/or a (meth)acrylic monomer containing carboxylic acid groups.

The (meth)acrylic monomer containing hydroxyl groups may be a (meth)acrylic acid ester containing a $C_2$ to $C_{20}$ alkyl group having at least one hydroxyl group. For example, the (meth)acrylic monomer containing hydroxyl groups may include 2-hydroxyethyl (meth)acrylate, 4-hydroxybutyl (meth)acrylate, 2-hydroxypropyl (meth)acrylate, 2-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethyleneglycol mono (meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth) acrylate, 2-hydroxy-3-phenyloxypropyl (meth)acrylate, 4-hydroxycyclopentyl (meth)acrylate, 4-hydroxycyclohexyl (meth)acrylate, cyclohexane dimethanol mono(meth)acrylate, and combinations thereof, but the (meth)acrylic monomer containing hydroxyl groups is not limited thereto. For example, 2-hydroxyethyl (meth)acrylate and/or 2-hydroxypropyl (meth)acrylate may be used.

The (meth)acrylic monomer containing hydroxyl groups is present in an amount of about 0.001 wt % to 50 wt %, for example, 0.005 wt % to 25 wt %, or 0.005 wt % to 10 wt %, or 0.01 wt % to 5 wt %, for example 1 wt %, 2 wt %, 3 wt %, 4 wt %, or 5 wt %, based on the total weight of the monomer mixture for the (meth)acrylic copolymer. Within these ranges and amounts, the adhesive film does not suffer from (or suffers from reduced) bubbling or detachment under the conditions used to test for heat resistance and moisture resistance, and can exhibit good reworkability and durability.

The (meth)acrylic monomer containing carboxylic acid groups may include (meth)acrylic acid and/or β-carboxyethyl (meth)acrylate, but is not limited thereto.

The (meth)acrylic monomer containing carboxylic acid groups may be present in an amount of about 0.001 wt % to 15 wt %, for example 0.01 wt % to 10 wt %, or 0.1 wt % to 5 wt %, for example 1, 2, 3, 4, or 5 wt %, based on the total weight of the monomer mixture for the (meth)acrylic copolymer. Within these ranges and amounts, the adhesive film exhibits improved cohesion, and thus can exhibit good durability of adhesion to the polarizing plate.

The (meth)acrylic copolymer may have a weight average molecular weight (Mw) of about 1,000,000 g/mol or less, for example, about 500,000 g/mol to about 1,000,000 g/mol, or about 500,000 g/mol, 600,000 g/mol, 700,000 g/mol, 800,000 g/mol, 900,000 g/mol, or 1,000,000 g/mol. Within these ranges and amounts, the adhesive film can exhibit good adhesion and durability, and can efficiently suppress light leakage. The weight average molecular weight may be calculated by polystyrene conversion in gel permeation chromatography.

The (meth)acrylic copolymer may have a glass transition temperature of about −43° C. to about −35° C. Within this range, the adhesive film can exhibit improved durability. In some embodiments, the (meth)acrylic copolymer has a glass transition temperature of about −43° C. to about −40° C.

The (meth)acrylic copolymer may have a polydispersity index about 1 to about 10. Within this range, the adhesive film can secure a durability margin. In some embodiments, the (meth)acrylic copolymer may have a polydispersity index of about 3 to about 7.

The (meth)acrylic copolymer may have a viscosity at 25° C. of about 3000 cPs to about 5000 cPs. Within this range, the adhesive composition can secure coatability. In some embodiments, the (meth)acrylic copolymer has a viscosity at 25° C. of about 3500 cPs to about 4200 cPs.

The (meth)acrylic copolymer may be present in an amount of about 60 wt % to 95 wt %, for example, about 65 wt % to 91 wt %, for example, about 80 wt % to 90 wt %, or about 80 wt %, 81 wt %, 82 wt %, 83 wt %, 84 wt %, 85 wt %, 86 wt %, 87 wt %, 88 wt %, 89 wt %, or 90 wt %, based on solids content in the adhesive composition for polarizing plates. Within these ranges and amounts, the adhesive composition can be coated using a high speed coating technique.

The cross-linking agent may be a mixture of a modified polyisocyanate cross-linking agent and a metal chelate cross-linking agent. If the modified polyisocyanate cross-linking agent is used alone, the adhesive film can exhibit poor durability and suffer from bubbling or detachment. If the metal chelate cross-linking agent is used alone, the polarizing plate can suffer from light leakage due to insufficient cohesion of the adhesive film.

The modified polyisocyanate cross-linking agent may include a polyisocyanate cross-linking agent having some end-capped isocyanate groups to improve fluidity of the (meth)acrylic copolymer. This enables the adhesive film to secure wettability and exhibit improved durability at high temperature and/or high humidity.

The modified polyisocyanate cross-linking agent may be prepared by end-capping some isocyanate groups by reaction of an alcohol or the like with a polyfunctional polyisocyanate cross-linking agent, such as a bi- or higher functional polyisocyanate cross-linking agent (i.e., having at least two isocyanate groups). For example, tri- or higher functional polyisocyanate cross-linking agents may be used. Nonlimiting examples of suitable polyfunctional polyisocyanate cross-linking agents include 2,4-toluene diisocyanate, 2,6-toluene diisocyanate, hydrogenated toluene diisocyanate, 1,3-xylene diisocyanate, 1,4-xylene diisocyanate, diphenylmethane-4,4-diisocyanate, 1,3-bis(isocyanatomethyl)cyclohexane, tetramethylxylene diisocyanate, 1,5-naphthalene diisocyanate, 2,2,4-trimethyl hexamethylene diisocyanate, 2,4,4-trimethyl hexamethylene diisocyanate, toluene diisocyanate adducts of trimethylolpropane, xylene diisocyanate adducts of trimethylolpropane, triphenylmethane triisocyanate, and methylenebis(phenylisocyanate. The alcohol may be a $C_2$ to $C_{16}$ alcohol having at least one hydroxyl group, for example ethanol through 1-hexadecanol (i.e., ethanol, propanol, butanol, pentanol, hexanol, heptanol, octanol, nonanol, decanol, undecanol, dodecanol, tridecanol, tetradecanol, pentadecanol, and hexadecanol). For example, one of two isocyanate groups may be end-capped in a bifunctional polyisocyanate cross-linking agent including two isocyanate groups, one or two isocyanate groups of three isocyanate groups may be end-capped in a trifunctional polyisocyanate cross-linking agent including three isocyanate groups, and one, two or three isocyanate groups of four isocyanate groups may be end-capped in a tetrafunctional polyisocyanate cross-linking agent including four isocyanate groups.

The isocyanate cross-linking agent may be present in an amount of about 0.1 parts by weight to about 20 parts by weight, for example, about 11 parts by weight to about 19 parts by weight, for example, about 13 parts by weight to about 18 parts by weight, or about 11, 12, 13, 14, 15, 16, 17, 18, or 19 parts by weight, based on 100 parts by weight of the (meth)acrylic copolymer. Within these ranges and amounts, the adhesive film can exhibit improved durability, and suppress (or reduce) light leakage.

The metal chelate cross-linking agent can promote cross-linking and increase the cross-linking rate. The metal chelate cross-linking agent may be any suitable metal chelate cross-linking agent. For example, the metal chelate cross-linking agent may include: acetyl acetones coordination compounds of a metal, such as aluminum, iron, copper, zinc, tin, titanium, nickel, antimony, magnesium, vanadium, chromium, zirconium, and the like; and acetoacetyl ester coordination compounds of the metal. In some embodiments, a metal chelate cross-linking agent containing aluminum can reduce the period of time needed to age the adhesive layer, thereby reducing the process time.

Since the adhesive film for polarizing plates according to one embodiment of the invention includes a metal chelate cross-linking agent, the adhesive film can include a specified amount of metal. For example, the metal may be present in an amount of about 0.1 wt % to about 10 wt %, for example, about 1 wt % to about 5 wt % in the adhesive film for polarizing plates. Within these ranges, the adhesive film can exhibit improved durability.

The metal chelate cross-linking agent may be present in an amount of about 0.1 parts by weight to about 10 parts by weight, for example, about 3 parts by weight to about 5 parts by weight, or about 3, 4, or 5 parts by weight, based on 100 parts by weight of the (meth)acrylic copolymer. Within these ranges and amounts, the adhesive film can exhibit improved durability.

The adhesive composition for polarizing plates may have a weight ratio of the isocyanate cross-linking agent to the metal chelate cross-linking agent of about 1 to about 6, for example, about 3 to about 6. Within these ranges, the adhesive film can exhibit good durability and less property change over time.

The adhesive composition for polarizing plates may further include an epoxy, aziridine, melamine, amine, imide or amide cross-linking agent in addition to the isocyanate and metal chelate cross-linking agents.

The cross-linking agent may be present in an amount of about 0.2 parts by weight to about 30 parts by weight, for example, about 9 parts by weight to about 25 parts by weight, or about 16, 17, 18, 19, 20, 21, 22, or 23 parts by weight, based on 100 parts by weight of the (meth)acrylic copolymer. In addition, the cross-linking agent may be present in an amount of about 4 wt % to about 40 wt %, for example, about 5 wt % to about 40 wt %, for example, about 10 wt % to about 20 wt %, based on solids content in the adhesive composition. Within these ranges, the polarizing plate can exhibit less light leakage and high durability.

The adhesive composition may further include a silane coupling agent to improve adhesion of the adhesive film to a glass plate, such as a panel and the like.

The silane coupling agent may be any suitable silane coupling agent. For example, the silane coupling agent may include epoxylated silicon compounds, such as 3-glycidoxypropyltrimethoxysilane, 3-glycidoxypropylmethyldimethoxysilane, 2-(3,4-epoxycyclohexyl)ethyltrimethoxysilane, and the like; silicon compounds containing an unsaturated polymerizable group, such as vinyltrimethoxysilane, vinyltriethoxysilane, and (meth)acryloxypropyltrimethoxysilane; silicon compounds containing an amino group, such as 3-aminopropyltrimethoxysilane, N-(2-aminoethyl)-3-aminopropyltrimethoxysilane, N-(2-aminoethyl)-3-aminopropylmethyldimethoxysilane, and the like; 3-chloropropyltrimethoxysilane; and the like, but the silane coupling agent is not limited thereto. In some embodiments, the silane coupling agent is an epoxylated silicon compound. The silane coupling agent improves adhesion of the adhesive film to an adherend, and thus, the adhesive film can exhibit improved durability.

The silane coupling agent may be present in an amount of about 0.01 parts by weight to about 5 parts by weight, for example, about 0.01 parts by weight to about 1 part by weight, for example, about 0.1 parts by weight to about 1.0 part by weight, based on 100 parts by weight of the (meth)acrylic copolymer. Within these ranges, the adhesive film can exhibit good adhesion to a liquid crystal panel, and the (meth)acrylic copolymer can exhibit good storage stability. The silane coupling agent may be present in an amount of about 0.1 wt % to about 10 wt %, for example, about 0.1 wt % to about 1 wt % based on solids content in the adhesive composition. Within these ranges, the adhesive film can exhibit good adhesion to the liquid crystal panel, and the (meth)acrylic copolymer can exhibit good storage stability.

The adhesive composition for polarizing plates may further include a solvent. The solvent may be any solvent which can dissolve the (meth)acrylic copolymer and the cross-linking agent. For example, the solvent may include methylethylketone, or a solvent mixture containing methylethylketone, but the solvent is not limited thereto.

Figure 1:
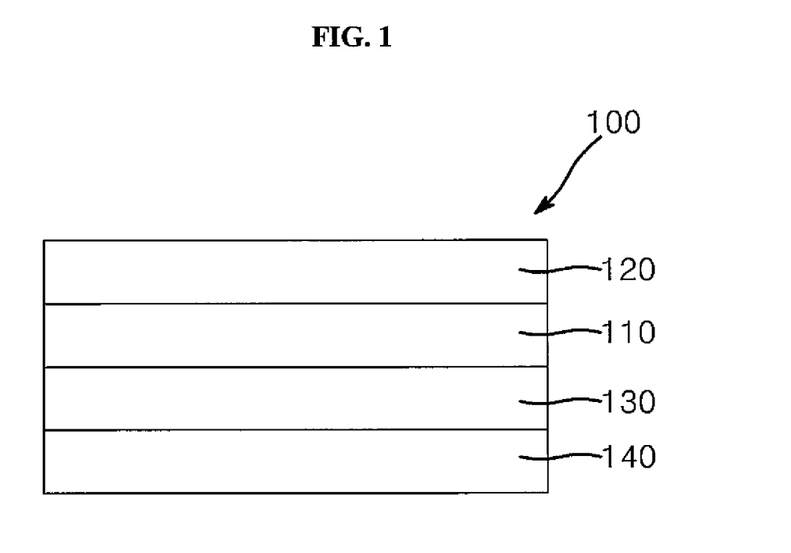
FIG. 1 is a schematic cross-sectional view of a polarizing plate according to one embodiment of the present invention.

Hereinafter, a polarizing plate according to one embodiment of the invention will be described with reference to FIG. 1. FIG. 1 is a schematic cross-sectional view of a polarizing plate according to one embodiment of the present invention.

Referring to FIG. 1, a polarizing plate 100 according to one embodiment may include: a polarizer 110; a first optical film 120 on an upper side (or first side) of the polarizer 110; a second optical film 130 on a lower side (or second side) of the polarizer 110; and an adhesive film 140 for polarizing plates on a lower side (or first side) of the second optical film 130. The adhesive film 140 may include the adhesive film for polarizing plates according to an embodiment of the invention.

The polarizer may be prepared from any polyvinyl alcohol film regardless of preparation method. For example, the polarizer may be a modified polyvinyl alcohol film, such as a partially formalized polyvinyl alcohol film, an acetoacetyl group-modified polyvinyl alcohol film, and the like. The polyvinyl alcohol film may have a degree of polymerization of 1,500 to 4,000. Within this range, the polyvinyl alcohol film can function as a polarizer, and exhibit suitable optical properties when used in a polarizer. The polarizer may be prepared by dyeing a polyvinyl alcohol film with iodine or a dichroic dye, followed by stretching in a certain direction. For example, the polarizer may be prepared by swelling, dyeing, and stretching. Each process may be performed by a method generally known to those skilled in the art.

The polarizer may have a thickness of 10 μm to 50 μm, but is not limited thereto.

Each of the first optical film and the second optical film may include at least one of a protective film and an optical compensation film. The protective film may be a retardation-free film and may include a cellulose, for example triacetyl cellulose (TAC) and the like, a cyclic olefin polymer (COP) such as amorphous cyclic olefin polymers and the like, a polyester such as poly(meth)acrylate, polycarbonate, polyethylene terephthalate (PET) and the like, a polyethersulfone, a polysulfone, a polyamide, a polyimide, a polyolefin, a polyacrylate, a polyvinyl alcohol, a polyvinyl chloride, a polyvinylidene chloride, and mixtures thereof. The protective film may have a thickness of 10 μm to 200 μm, for example 30 μm to 120 μm, but is not limited thereto.

The optical compensation film may be a film for imparting retardation, and may be any suitable retardation film. The retardation film may be any retardation film typically used in polarizing plates. For example, the retardation film may include a cyclic olefin polymer, a polycarbonate, a poly(meth)acrylate, and/or a polyester film.

The adhesive film for polarizing plates may be prepared by drying and/or aging the adhesive composition for polarizing plates, followed by curing. Drying and/or aging may be performed at 30° C. to 35° C. for 24 hours to 96 hours, but they are not limited thereto.

The adhesive film for polarizing plates may have a thickness of 5 μm to 100 μm.

Although not shown in FIG. 1, the polarizing plate according to one embodiment of the invention may be attached to a panel (for example, a liquid crystal display panel) via the adhesive film for polarizing plates.

The polarizing plate according to embodiments of the present invention can minimize (or reduce) light leakage when attached to a panel, and has a light leakage value (ΔL) of 0 to 0.4, for example 0 to 0.3, or 0 to 0.1, as represented by Equation 3:

$$\Delta L = [(a+b+d+e)/4]/c - 1 \qquad \text{Equation 3}$$

In Equation 3, a, b, d and e are the brightnesses at the midpoints of respective sides of a panel upon which the polarizing plate is stacked, and c is the brightness at the central site of the panel upon which the polarizing plate is stacked, before reliability testing.

In measuring light leakage, the sample (i.e. the polarizing plate) was left at 85° C. for 250 hours, or at 60° C./90% RH for 250 hours (as moisture and heat resistance conditions), and then left at 25° C. for 1 hour or longer.

According to one embodiment of the invention, an optical display may include an adhesive film for polarizing plates or a polarizing plate. The optical display may include a liquid crystal display, such as a TFT-LCD or the like, but is not limited thereto.

Figure 2:
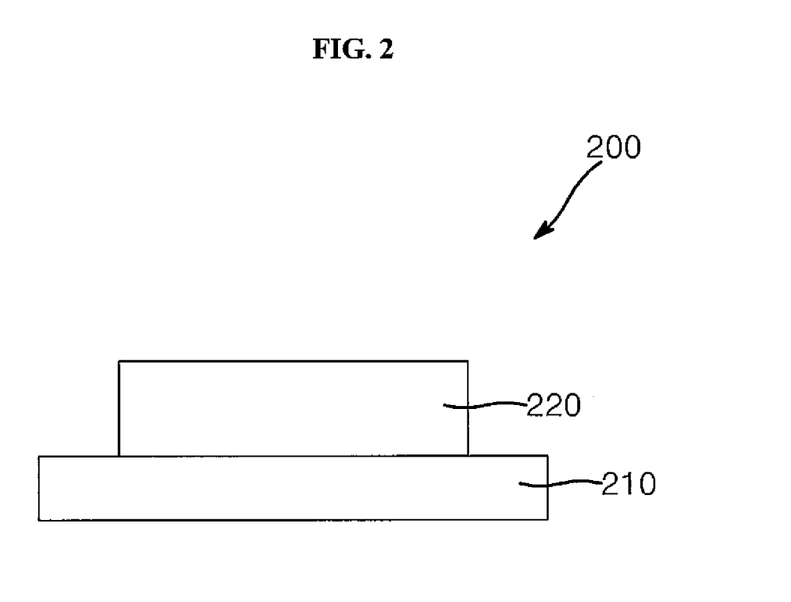
FIG. 2 is a schematic cross-sectional view of an optical display according to another embodiment of the present invention.

Hereinafter, an optical display according to one embodiment of the invention will be described with reference to FIG. 2. FIG. 2 is a schematic cross-sectional view of an optical display according to one embodiment of the present invention.

Referring to FIG. 2, an optical display 200 according to one embodiment of the invention may include a panel 210; and a polarizing plate 220 on an upper side (or first side) of the panel 210. The polarizing plate 220 may be the polarizing plate according to an embodiment of the invention. The optical display may further include the polarizing plate on a lower side (or second side) of the panel, although the polarizing plate on the lower side (or second side) of the panel is not shown in FIG. 2. Here, the polarizing plate on the lower side (or the second side) of the panel may be the polarizing plate according to an embodiment of the present invention.

Hereinafter, the present invention will be described with reference to some examples. However, it should be noted that these examples are provided for illustration only and are not to be construed in any way as limiting the present invention.

PREPARATIVE EXAMPLE 1

In a 1 L reactor provided with a thermometer, a reflux condenser and a stirrer, 97 parts by weight of n-butyl acrylate, and a solvent (40 parts by weight of ethyl acetate and 45 parts by weight of methylethylketone) were added, followed by nitrogen substitution at 65° C. for 30 minutes. Next, 0.06 parts by weight of 2,2'-azobisisobutyronitrile (provided as an initiator) was diluted with 2 parts by weight of ethyl acetate, and then introduced into the reactor. Next, 2 parts by weight of acrylic acid and 1 part by weight of 2-hydroxyethyl methacrylate were introduced dropwise into the reactor, followed by reaction for 6 hours while the temperature of the reactor was maintained at 65° C. Next, the reactor was heated to 70° C., and the reaction continued for 2 hours. After completion of the reaction, the resulting mixture was diluted with 130 parts by weight of ethyl acetate, thereby obtaining an acrylic copolymer having a weight average molecular weight of 900,000 g/mol.

PREPARATIVE EXAMPLE 2

In a 1 L reactor provided with a thermometer, a reflux condenser and a stirrer, 97 parts by weight of n-butyl acrylate, and 85 parts by weight of ethyl acetate as a solvent were added, followed by nitrogen substitution at 65° C. for 30 minutes. Next, 0.04 parts by weight of 2,2'-azobisisobutyronitrile (provided as an initiator) was diluted with 2 parts by weight of ethyl acetate, and then introduced into the reactor. Next, 2 parts by weight of acrylic acid and 1 part by weight of 2-hydroxyethyl methacrylate were introduced dropwise into the reactor, followed by reaction for 6 hours while the temperature of the reactor was maintained at 65° C. Next, the reactor was heated to 70° C., and the reaction continued for 2 hours. After completion of the reaction, the resulting mixture was diluted with 130 parts by weight of ethyl acetate, thereby obtaining an acrylic copolymer having a weight average molecular weight of 1,100,000 g/mol.

PREPARATIVE EXAMPLE 3

In a 1 L reactor provided with a thermometer, a reflux condenser and a stirrer, 97 parts by weight of n-butyl acrylate, 2 parts by weight of acrylic acid, 1 part by weight of 2-hydroxyethyl methacrylate, and 60 parts by weight of ethyl acetate and 25 parts by weight of methylethylketone as a solvent were added, followed by nitrogen substitution at 65° C. for 30 minutes. Next, 0.04 parts by weight of 2,2'-azobisisobutyronitrile (provided as an initiator) was diluted with 2 parts by weight of ethyl acetate, and then introduced into the reactor. Next, the reaction continued for 6 hours while the temperature of the reactor was maintained at 65° C., followed by heating the reactor to 70° C., and continuing the reaction for 2 hours. After completion of the reaction, the resulting mixture was diluted with 130 parts by weight of ethyl acetate, thereby obtaining an acrylic copolymer having a weight average molecular weight of 1,000,000 g/mol.

The holding times of the acrylic copolymers of Preparative Examples 1 to 3 were measured. To measure the holding time, a 26 μm thick coating layer was prepared by coating a (meth)acrylic copolymer onto a release film, followed by drying at room temperature, and the prepared coating layer was dried again in an oven at 90° C. for 4 minutes, thereby preparing a 26 μm thick coating layer. The coating layer was stacked on a polarizing plate (stacked body of TAC-polarizer-TAC) and then cut into a specimen having a size of 15 mm×120 mm (width×length), followed by attaching a 15 mm×15 mm (width×length) portion to a glass plate. When the specimen was peeled off by applying constant force (750 gf) using a universal test machine (UTM), the elapsed time (unit: sec) until the specimen started to be separated was measured. Results are shown in Table 1.

TABLE 1

|  | Preparative Example 1 | Preparative Example 2 | Preparative Example 3 |
|---|---|---|---|
| Weight average molecular weight (g/mol) | 900,000 | 1,100,000 | 1,000,000 |
| Holding time (sec) | 300 | 350 | 420 |
| Arrangement of functional groups | Uniform arrangement of functional groups | Uniform arrangement of functional groups | Non-uniform arrangement of functional groups |

As shown in Table 1, since the acrylic copolymers of Preparative Examples 1 and 2 had shorter holding times than did Preparative Example 3, it could be confirmed that the functional groups (i.e., hydroxyl groups, carboxylic acid groups) were uniformly arranged on a copolymer backbone in the acrylic copolymers of Preparative Examples 1 to 2, as compared with those in the acrylic copolymer of Preparative Example 3. The copolymer in which the functional groups are uniformly arranged can have short holding times, and the copolymer in which the functional groups are non-uniformly arranged can have long holding times due to greater interaction between portions containing a relatively large number of the functional groups in the copolymer.

EXAMPLE 1

100 parts by weight of the acrylic copolymer of Preparative Example 1, and 3 parts by weight of methylethylketone as a solvent were introduced into a reactor, followed by stirring. Next, an isocyanate cross-linking agent 1, a metal chelate cross-linking agent (aluminum acetylacetonate) and a silane coupling agent (KBE-403, Shinetsu Chemical Co., Ltd.) were introduced into the reactor in the amounts (unit: parts by weight) as listed in Table 2, followed by stirring, thereby preparing an adhesive composition for polarizing plates.

EXAMPLES 2 and 3

An adhesive composition for polarizing plates was prepared as in Example 1 except that the amount of the metal chelate cross-linking agent was different, as reflected in Table 2.

COMPARATIVE EXAMPLES 1 to 3

An adhesive composition for polarizing plates was prepared as in Example 1 except that the (meth)acrylic copolymer and the cross-linking agent were different, as reflected in Table 2.

TABLE 2

|  |  |  | Example 1 | Example 2 | Example 3 | Comparative Example 1 | Comparative Example 2 | Comparative Example 3 |
|---|---|---|---|---|---|---|---|---|
| (Meth)acrylic copolymer | | Preparative Example 1 | 100 | 100 | 100 | 100 | — | — |
| | | Preparative Example 2 | — | — | — | — | 100 | — |
| | | Preparative Example 3 | — | — | — | — | — | 100 |
| Cross-linking agent | Isocyanate-based | Isocyanate cross-linking agent 1 | 13 | 18 | 18 | — | 18 | 18 |
| | | Isocyanate cross-linking agent 2 | — | — | — | 18 | — | — |
| | Metal chelate-based | Aluminum acetylacetonate | 3 | 3 | 5 | — | 3 | 3 |
| Silane coupling agent | | KBE-403 (Shin-Etsu Chemical Co., Ltd.) | 0.08 | 0.08 | 0.08 | 0.08 | 0.08 | 0.08 |

*Isocyanate cross-linking agent 1: Modified polyisocyanate cross-linking agent. 100 parts by weight of Coronate L (Nippon Polyurethane Co., Ltd.) was diluted with 50 parts by weight of toluene, and 2 parts by weight of propanol was then added to the diluted Coronate L, followed by reaction at 50° C. for 3 hours. Next, a reduction in the amount of isocyanate groups was confirmed using FTIR, thereby preparing the isocyanate cross-linking agent (some of the isocyanate groups were end-capped).
* Isocyanate cross-linking agent 2: 100 parts by weight of Coronate L (Nippon Polyurethane Co., Ltd.) was diluted with 50 parts by weight of toluene, thereby preparing the isocyanate cross-linking agent 2 (isocyanate groups were not end-capped).

The adhesive layers for polarizing plates and the polarizing plates prepared in the Examples and Comparative Examples were evaluated as to the following properties. Results are shown in Table 3.

TABLE 3

| | | Example 1 | Example 2 | Example 3 | Comparative Example 1 | Comparative Example 2 | Comparative Example 3 |
|---|---|---|---|---|---|---|---|
| Peel strength (gf/25 mm) | Initial peel strength | 310 | 250 | 230 | 200 | 220 | 230 |
| | 5 minutes | 160 | 120 | 95 | 90 | 80 | 30 |
| | 30 minutes | 1245 | 610 | 390 | 315 | 286 | 35 |
| | 60 minutes | 2795 | 2050 | 1595 | 920 | 760 | 90 |
| Peel strength ratio | | 9.0 | 8.3 | 6.9 | 4.6 | 3.5 | 0.4 |
| Storage modulus ($\times 10^5$ Pa) | | 6.89 | 6.93 | 7.10 | 7.23 | 7.19 | 4.15 |
| Gel fraction (%) | | 83 | 87 | 90 | 85 | 87 | 85 |
| Transparency | | Transparent | Transparent | Transparent | Transparent | Transparent | Transparent |
| Creep (μm) | | 52 | 48 | 46 | 40 | 53 | 50 |
| Light leakage | | ○ | ○ | ⊚ | ⊚ | ○ | Δ |
| Durability | | ○ | ○ | ○ | X | Δ | X |
| Reworkability | | ○ | ○ | ○ | ○ | ○ | ○ |

As shown in Table 3, although the adhesive film according to embodiments of the invention was a hard type adhesive film based on storage modulus and gel fraction, it comprises a (meth)acrylic copolymer in which the reactive functional groups are uniformly arranged, an end-capped isocyanate cross-linking agent and a metal chelate cross-linking agent, thereby enabling the adhesive film to have high peel strength at high temperature and exhibit improved durability. In addition, the adhesive film according to embodiments of the invention was effective in suppressing (or reducing) light leakage of the polarizing plate due to high storage modulus and high cohesion as determined by a creep distance of 60 μm or less, and exhibited good cuttability and good reworkability. Thus, the adhesive films for polarizing plates according to embodiments of the present invention are hard type adhesive films that exhibit high peel strength due to good fluidity and wettability under high temperature and/or high humidity conditions, and do not suffer from (or have a reduce risk of) detachment or wrinkling at the edges of the polarizing plate under high or low temperature thermal shock and moist heat conditions. Thus, the adhesive films according to embodiments of the present invention exhibit good durability. Embodiments of the present invention provide an adhesive film for polarizing plates, which is a hard type adhesive film, and can suppress light leakage by controlling the stress due to shrinkage or expansion of the polarizing plate under high or low temperature thermal shock and moist heat conditions. Embodiments of the present invention provide an adhesive film for polarizing plates, which is a hard type adhesive film that exhibits good cuttability and reworkability.

Conversely, the adhesive film of Comparative Example 1 (using only the isocyanate cross-linking agent not subjected to end-capping) exhibited poor durability, and suffered from bubbling and detachment.

In addition, the adhesive film of Comparative Example 2 (in which the (meth)acrylic copolymer had a weight average molecular weight of greater than 1,000,000 g/mol although the functional groups were uniformly arranged in the (meth) acrylic copolymer) exhibited poor durability. Further, the adhesive film of Comparative Example 3 (including the (meth)acrylic copolymer in which the functional groups were not uniformly arranged) suffered from detachment and caused light leakage of the polarizing plate.

(1) Peel strength (gf/25 mm): 180° peel strength between the adhesive film for polarizing plates and a glass substrate was measured in accordance with JIS 2107. Each of the adhesive compositions for polarizing plates of the Examples and Comparative Examples was coated onto a polarizing plate, followed by aging under constant temperature and humidity conditions of 35° C. and 45% RH for 2 days, thereby preparing a polarizing plate specimen on which an adhesive film for polarizing plates was formed. The polarizing plate may be a polarizing plate prepared by stacking triacetyl cellulose (TAC) protective films on both surfaces of a polarizer. The specimen was cut into a size of 25 mm×210 mm×280 μm (width×length×thickness), and an area of 25 mm×140 mm (width×length) of the specimen was laminated on a glass plate (25 mm×140 mm, width×length) such that the adhesive film was laminated on the glass substrate, followed by compression at 50° C. and 3.5 atm. Next, the specimen was left at 25° C. for 1 hour, thereby preparing a specimen for measurement of peel strength. The adhesive film and the glass plate were connected to upper and lower jigs under a 30 kgf load cell, respectively, followed by peeling at an angle of 180° at 25° C. and at a tensile speed of 300 mm/min, thereby measuring load upon peeling. The measured load was taken as initial peel strength (peel strength A). A dry heat chamber was mounted on a tensile analyzer, followed by setting the internal temperature of the chamber to 85° C. The specimen was left in the chamber of 85° C. for 5 minutes, 30 minutes and 60 minutes, respectively. Next, the adhesive film and the glass plate were connected to the upper and lower jigs under a 30 kgf load cell, respectively, followed by peeling at an angle of 180° at 85° C. and at a tensile speed of 300 mm/min, thereby measuring load upon peeling. The load measured after leaving the specimen for 60 minutes was taken as peel strength B. The peel strength ratio was calculated by Equation 1, described above.

(2) Storage modulus (Pa): Each of the adhesive compositions for polarizing plates was coated onto a polyethylene terephthalate release film, followed by drying at 120° C. for 3 minutes, thereby preparing a 20 μm thick adhesive layer. Several cured adhesive layers were stacked to form a 1 mm thick adhesive sheet, which was then cut into a circular specimen having a diameter of 8 mm (using a parallel plate fixture), thereby preparing a specimen. The storage modulus was measured using a storage modulus tester (Physica, Anton Paar Co., Ltd.) from 0° C. to 120° C. at a strain of 10% and a frequency of 10 Hz, and the storage modulus at 30° C. was obtained.

(3) Gel fraction (%): Each of the adhesive compositions for polarizing plates was coated onto a polyethylene terephthalate release film, followed by drying at 120° C. for 3 minutes, thereby preparing a 20 μm thick adhesive layer. After coating, the adhesive composition was left at 35° C. and 45% RH for 1 hour, thereby obtaining 0.5 g of an adhesive. Next, the adhesive was wrapped with a wire mesh (W1), which was weighed in advance, such that the adhesive did not leak, followed by weighing (W2). Then, the adhesive and the wire mesh were placed into a sample bottle. Next, 50 cc of ethyl acetate was added to the sample bottle, followed by leaving the adhesive and the wire mesh at 25° C. for 1 day. Next, the adhesive-containing wire mesh was dried at 100° C. for 12 hours, followed by weighing the adhesive-containing wire mesh (W3). The gel fraction was calculated according to Equation 2.

$$\text{Gel fraction (\%)}=(W3-W1)/(W2-W1)\times 100 \quad \text{Equation 2}$$

In Equation 2, W1, W2 and W3 are defined as in the above description.

(4) Transparency: Each of the adhesive compositions for polarizing plates was coated onto a polyethylene terephthalate release film, followed by drying at 120° C. for 3 minutes, thereby preparing a 20 μm thick adhesive layer. Next, the adhesive layer was observed by the naked eye. No haze was rated as "Transparent," and haze was rated as "Opaque".

(5) Creep (μm): The polarizing plate prepared in the (1) Peel strength measurement was cut into a size of 15 mm×120 mm (width×length). Next, an area of 15 mm×15 mm (width× length) in the polarizing plate was laminated onto a glass plate, followed by compression at 50° C. and 3.5 atm. Next, the polarizing plate was left at 25° C. for 3 days, thereby preparing a specimen. The specimen was tightly secured to a universal test machine (UTM), followed by pulling the specimen at a constant force of 2250 gf for 1000 sec to measure creep distance of the adhesive film.

(6) Light leakage: A polarizing plate prepared in the same manner as in the (1) Peel strength measurement was cut into a size of 100 mm×125 mm (width×length), followed by attaching the specimens to both surfaces of a liquid crystal display cell such that the specimens of both surfaces were orthogonal to each other in terms of transmission axis. The specimens were left at 70° C. for 500 hours, followed by operating the panel at room temperature in a darkroom to observe light leakage by the naked eye.

◉: No observed occurrence of non-uniformity in light transmission such as light leakage at upper/lower/left/right edges ○: Difficult to determine non-uniformity in light transmission such as light leakage by the naked eye at upper/lower/left/right edges Δ: Slight non-uniformity in light transmission such as light leakage at upper/lower/left/right edges X: Occurrence of severe non-uniformity in light transmission such as light leakage at upper/lower/left/right edges (7) Durability: A polarizing plate prepared in the same manner as in the (1) Peel strength measurement was cut into a size of 100 mm×125 mm (width×length). Next, the specimen was attached to a liquid crystal display cell, followed by compression at 50° C. and 3.5 atm. The specimen was subjected to 200 cycles of treatment each including treatment under dry heat conditions (i.e., at 85° C. for 250 hours), treatment under moist heat conditions (i.e., at 60° C. and 90% RH for 250 hours), and treatment under thermal shock conditions (i.e., at −40° C. for 30 minutes and at 85° C. for 30 minutes). Next, the specimen was left at 25° C. for 1 hour. The occurrence of detachment and wrinkling of the adhesive film at the edges of the polarizing plate was confirmed. Evaluation criteria are as follows.

○: No observed bubbling, peeling and/or detachment

Δ: Slight bubbling, peeling and/or detachment

X: Severe bubbling, peeling and/or detachment (8) Reworkability: A polarizing plate prepared in the same manner as in the (1) Peel strength measurement was cut into a size of 200 mm×250 mm (width×length), followed by attaching the specimen to a liquid crystal display cell. Next, the specimen was left in a drying oven at 50° C. for 4 hours, followed by leaving the specimen at room temperature for 30 days.

○: The polarizing plate could be peeled off and the adhesive was not transferred to the liquid crystal cell Δ: The adhesive was transferred to the liquid crystal cell and remained thereon while the polarizing plate could be peeled off X: The polarizing plate could not be peeled off While certain exemplary embodiments of the invention have been described herein, it should be understood that various modifications, changes, alterations, and equivalent embodiments can be made by those skilled in the art without departing from the spirit and scope of the invention, as defined in the following claims.

What is claimed is:

1. An adhesive film for a polarizing plate formed from a composition comprising a (meth)acrylic copolymer and a cross-linking agent, the adhesive film having a peel strength ratio of about 6 or greater, the peel strength ratio being calculated according to Equation 1:

$$\text{Peel strength ratio} = B/A \qquad \text{Equation 1}$$

wherein A is a peel strength in gf/25 mm of the adhesive film when peeled off of a glass substrate at an angle of 180° at 25° C. and at a tensile speed of 300 mm/min using a 30 kgf load cell; and B is a peel strength in gf/25 mm of the adhesive film when left at 85° C. for 60 minutes, and then peeled off of the glass substrate at an angle of 180° at 85° C. and at a tensile speed of 300 mm/min using a 30 kgf load cell, and wherein the peel strength A and the peel strength B are measured on a specimen in which a polarizing plate including the adhesive film is formed on a first surface of the glass substrate wherein the adhesive film has a peel strength A of about 200 gf/25 mm to about 500 gf/25 mm, and a peel strength B of about 1500 gf/25 mm to about 3000 gf/25 mm.

2. The adhesive film according to claim 1, wherein the adhesive film has a gel fraction of about 70% or greater, as calculated by Equation 2:

$$\text{Gel fraction (\%)} = (W3 - W1)/(W2 - W1) \times 100 \qquad \text{Equation 2}$$

wherein W1 is a weight of a wire mesh;

W2 is a first total weight of the wire mesh and an adhesive, wherein the first total weight is obtained by drying the adhesive composition at 120° C. for 3 minutes and leaving the adhesive composition at 35° C. and 45% RH for 1 hour, and then placing the adhesive composition on the wire mesh; and W3 is a second total weight of the wire mesh and the adhesive, wherein the second total weight is obtained by drying the adhesive composition at 120° C. for 3 minutes and leaving the adhesive composition at 35° C. and 45% RH for 1 hour, and then placing the adhesive composition and the wire mesh in a sample bottle, followed by adding ethyl acetate into the sample bottle allowing the sample bottle to stand at 25° C. for 1 day, followed by drying at 100° C. for 12 hours.

3. The adhesive film according to claim 1, wherein the (meth)acrylic copolymer comprises hydroxyl groups and/or carboxylic acid groups uniformly arranged on and connected to a copolymer backbone at intervals.

4. The adhesive film according to claim 1, wherein the (meth)acrylic copolymer is polymerized by introducing a (meth)acrylic monomer containing a non-reactive functional group, followed by dropwise addition of a (meth)acrylic monomer containing a reactive functional group.

5. The adhesive film according to claim 1, wherein the (meth)acrylic copolymer has a weight average molecular weight of about 1,000,000 g/mol or less.

6. The adhesive film according to claim 1, wherein the cross-linking agent comprises a mixture of a modified polyisocyanate cross-linking agent and a metal chelate cross-linking agent.

7. The adhesive film according to claim 6, wherein the modified polyisocyanate cross-linking agent is prepared by end-capping an isocyanate group of a polyfunctional polyisocyanate cross-linking agent.

8. The adhesive film according to claim 6, wherein the metal chelate cross-linking agent comprises an aluminum chelate cross-linking agent.

9. The adhesive film according to claim 1, further comprising about 0.1 wt % to about 10 wt % of a metal selected from the group consisting of aluminum, iron, copper, zinc, tin, titanium, nickel, antimony, magnesium, vanadium, chromium, zirconium, and combinations thereof.

10. The adhesive film according to claim 6, wherein a weight ratio of the modified polyisocyanate cross-linking agent to the metal chelate cross-linking agent in the composition is about 1 to about 6.

11. The adhesive film according to claim 6, wherein a weight ratio of the modified polyisocyanate cross-linking agent to the metal chelate cross-linking agent in the composition is about 3 to about 6.

12. The adhesive film according to claim 1, wherein the composition further comprises a silane coupling agent.

13. The adhesive film according to claim 1, wherein the adhesive film has a storage modulus at 30° C. of about $5 \times 10^5$ Pa to about $9 \times 10^5$ Pa, as measured from 0° C. to 120° C. at a strain of 10% and a frequency of 10 Hz.

14. A polarizing plate comprising the adhesive film for polarizing plates according to claim 1.

15. An optical display comprising the polarizing plate according to claim 14.

* * * * *